Figure 1:
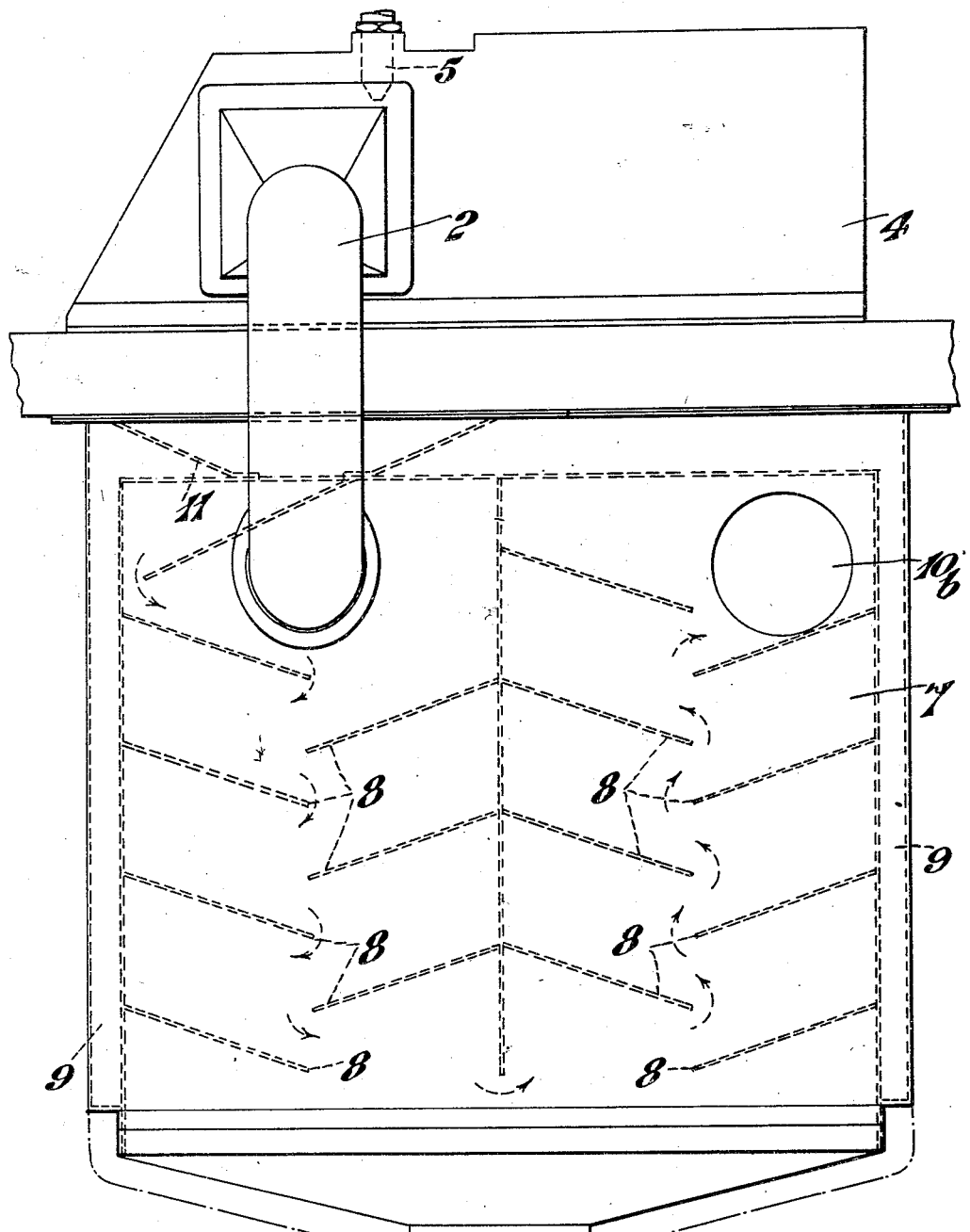

Dec. 9, 1930.   G. W. F. CATLIN   1,784,418

APPARATUS FOR SEPARATING FAT OR OTHER MATERIAL FROM GASES

Filed Jan. 8, 1929   2 Sheets-Sheet 1

Inventor
Gordon William Frederick Catlin

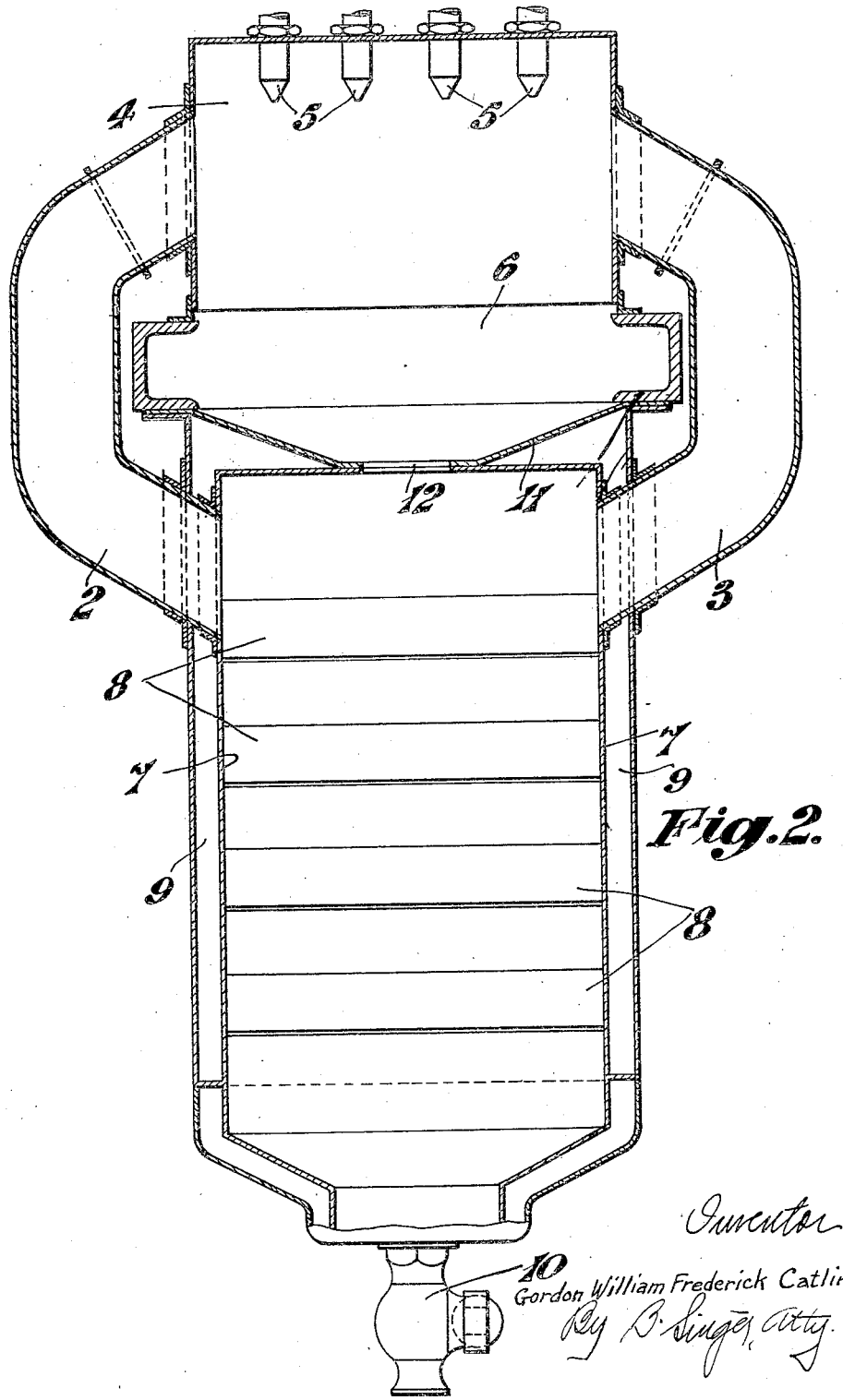

Patented Dec. 9, 1930

1,784,413

UNITED STATES PATENT OFFICE

GORDON WILLIAM FREDERICK CATLIN, OF ST. ALBANS, ENGLAND

APPARATUS FOR SEPARATING FAT OR OTHER MATERIAL FROM GASES

Application filed January 8, 1929, Serial No. 331,131, and in Great Britain February 3, 1928.

This invention relates to apparatus for separating fat or other material from gases and has reference more especially to an arrangement and device whereby molten fat in a finely divided state of suspension in air may be readily separated therefrom without unduly affecting the normal functioning of the apparatus.

Broadly the present invention resides in an improved form of apparatus for attaining the object referred to and according to which a mixture of finely divided fat or other material and a gas such as air is drawn off laterally from the chamber in which the mixture is formed, said mixture being then adapted to encounter one or a series of baffle devices serving to retain all or a considerable quantity of the relatively solid material while the gas is further adapted to pass through a suitable outlet port or its equivalent arranged in such a manner that by the time the gas has arrived at said delivery portion of the apparatus all or the desired amount of solid material has been retained within the apparatus and the gas may be allowed to escape or be subjected to further treatment.

In the accompanying drawings Figure 1 illustrates in part sectional side elevation one convenient form of apparatus by means of which molten fat may be separated from air in accordance with the invention, while Figure 2 is a sectional side elevation of the apparatus shown by Figure 1.

Referring now to these drawings the numerals 2 and 3 designate respectively two oppositely disposed and laterally extending ducts adapted to emerge from respectively opposite sides of a chamber 4 which forms a housing for the fat and air mixture which latter is formed for instance in the case where one or a series of fat spraying nozzles 5 are employed for the treatment or dressing of sponge cake tins preparatory to the baking process. The housing 4 according to the example illustrated encloses the jet portions of the nozzles while the articles to be treated with fat may be adapted to pass through an opening 6 in a portion of the apparatus connecting the mixing chamber 4 to an auxiliary chamber 7 located below the mixing chamber 4. The opening 6 also forms a gas inlet to the chamber 4. The ducts 2 and 3 are adapted to bend and communicate with the auxiliary chamber 7 located immediately below the mixture chamber 4 said auxiliary chamber being provided with a number of baffle elements 8 consisting for instance of plates disposed in such relation that the mixture is caused to assume a tortuous passage when being drawn through the auxiliary chamber and as shown by the arrows in Figure 1. During the passage of the mixture through the separating chamber, fat is deposited upon the baffle plates 8 and in the present example the entire auxiliary chamber 7 is water-jacketed as shown at 9, the water being kept at a temperature sufficient to maintain the fat in a molten condition. By this means the fat deposited within the separating chamber 7 is adapted to collect at the bottom thereof and a drain-off cock 10 is provided for enabling the apparatus to be cleaned from time to time.

Any suitable form of extracting fan or device may be employed for drawing off the air from the apparatus there being provided an exhaust port 10b arranged near the upper portion of the auxiliary chamber 7 and located at one of the sides of the same but conveniently remote from the entry portion for the lateral and downwardly depending ducts 2 and 3 communicating with the upper chamber 4 within which the mixture is formed initially. Any fat or material which is not drawn through into the auxiliary chamber may be adapted to fall directly upon a collecting plate 11 shaped or disposed so that the said fat or material may travel through a port or delivery opening 12 communicating directly with the auxiliary chamber 7.

The auxiliary chamber 7 may be fitted to the remainder of the apparatus in any desired manner and the system of water jacketting employed may of course be replaced by any other equivalent form of device for preserving the requisite high temperature within the auxiliary chamber.

In the case where a device of the foregoing description is employed for separating oils or materials which remain fluid at ordinary temperatures the use of a water jacket for the auxiliary chamber may be dispensed with.

What I claim and desire to secure by Letters Patent is:—

1. Apparatus for separating fat from gases, comprising a mixing chamber, spray nozzles for admitting fat to the mixing chamber, a gas inlet to the mixing chamber, two outlets for the mixture from the mixing chamber, a separating chamber for superfluous fat and gas, two oppositely disposed inlets to the upper portion of the separating chamber and extending from the outlets in the mixing chamber, a series of baffle plates arranged in the separating chamber, a gas exhaust outlet on the separating chamber, and a closable discharge outlet on the separating chamber for the fat separated from the gas.

2. Apparatus for separating fat from gases, comprising a mixing chamber, spray nozzles for admitting fat to the mixing chamber, a gas inlet to the mixing chamber, two outlets for the mixture from the mixing chamber, a separating chamber for superfluous fat and gas, a heating jacket, two oppositely disposed inlets to the upper portion of the separating chamber and extending from the outlets in the mixing chamber, a series of baffle plates arranged in the separating chamber, a gas exhaust outlet on the separating chamber, and a closable discharge outlet on the separating chamber for the fat separated from the gas, the heating jacket being arranged around the separating chamber.

3. Apparatus for separating fat from gases, comprising a mixing chamber, spray nozzles for admitting fat to the mixing chamber, a gas inlet to the mixing chamber, two outlets for the mixture from the mixing chamber, a separating chamber for superfluous fat and gas, two series of baffles arranged side by side in the separating chamber, two oppositely disposed inlets to the upper portion of one of the series of baffles in the separating chamber and extending from the outlets in the mixing chamber, a gas exhaust outlet on the separating chamber, and a closable discharge outlet on the separating chamber below both series of baffles for the fat separated from the gas, the gas exhaust outlet being arranged at the upper end of the other series of baffles in the separating chamber.

In witness whereof I affix my signature.

GORDON WILLIAM FREDERICK CATLIN.